United States Patent

Hirunuma et al.

[11] Patent Number: 6,018,420
[45] Date of Patent: Jan. 25, 2000

[54] BINOCULAR HAVING HAND-VIBRATION COMPENSATION SYSTEM

[75] Inventors: Ken Hirunuma, Tokyo; Shinji Tsukamoto, Saitama-ken; Moriyasu Kanai, Tokyo, all of Japan

[73] Assignee: Asahi Kogaku Kogyo Kabushiki Kaisha, Tokyo, Japan

[21] Appl. No.: 09/203,523

[22] Filed: Dec. 1, 1998

[30] Foreign Application Priority Data

Dec. 2, 1997 [JP] Japan ................................ 9-331739

[51] Int. Cl.⁷ ............................. G02B 27/64; G02B 23/00
[52] U.S. Cl. ........................... 359/557; 359/407; 359/409; 359/554; 359/835
[58] Field of Search ................................ 359/407–420, 359/480–482, 431, 554–557, 813–814, 823–824, 831–837; 396/52–55; 348/208

[56] References Cited

U.S. PATENT DOCUMENTS

| 4,013,339 | 3/1977 | Ando et al. | 359/556 |
| 5,231,534 | 7/1993 | Kato | 359/432 |
| 5,280,387 | 1/1994 | Maruyama | 359/554 |
| 5,387,999 | 2/1995 | Hayashi | 359/557 |
| 5,461,513 | 10/1995 | Maruyama | 359/837 |
| 5,754,339 | 5/1998 | Kanai et al. | 359/557 |
| 5,768,016 | 6/1998 | Kanbara | 359/557 |
| 5,917,653 | 6/1999 | Taniguchi | 359/557 |

FOREIGN PATENT DOCUMENTS

| 2-81009 | 3/1990 | Japan . |
| 2284113 | 11/1990 | Japan . |
| 3237438 | 10/1991 | Japan . |
| 6-43365 | 2/1994 | Japan . |
| 7248522 | 9/1995 | Japan . |
| 7311368 | 11/1995 | Japan . |

*Primary Examiner*—Thong Nguyen
*Attorney, Agent, or Firm*—Greenblum & Bernstein, P.L.C.

[57] ABSTRACT

A binocular is provided with a pair of telescopic optical systems. Each of the pair of telescopic optical systems has an objective lens, a pair of positive and negative compensation lenses, an erecting system, and an observing optical system. The negative compensation lens of the right telescopic optical system and the positive compensation lens of the left telescopic optical system are held by a rotatable first frame. The positive compensation lens of the right telescopic optical system and the negative compensation lens of the left telescopic optical system are held by a rotatable second frame. The first and second frames are driven in the opposite directions to each other such that the vibration of the image can be compensated.

8 Claims, 5 Drawing Sheets

BINOCULAR HAVING HAND-VIBRATION COMPENSATION SYSTEM

BACKGROUND OF THE INVENTION

The present invention relates to a binocular that has a hand-vibration compensation system.

Recently, binoculars provided with hand-vibration compensation systems for preventing vibrations of an observed image due to hand-vibration of a user have been developed.

A binocular is provided with a pair of telescopic optical systems arranged side by side. Each of the systems comprises an objective lens, an erecting system such as a Porro prism and an eyepiece. In one type of the hand-vibration compensation systems, compensation optical elements are arranged in the telescopic optical systems. The compensation optical elements are driven by a driving mechanism. Since moving of the compensation optical element changes a direction in which a light beam proceeds, the movement of the compensation optical element moves the image in the user view. In the other words, when the image is moved by the hand-vibration, the compensation optical element is driven to move the image so that it is observed as if it stays at the same position, thus the image vibration can be compensated.

A compensation lens may be used as the compensation optical element. At the given position of the compensation lens, moving amount of the image due to the decentering of the compensation lens depends on the decentering amount and a refractive power of the compensation lens. The larger the refractive power is or the larger the decentering amount is, the larger the moving amount of the image is.

Since the refractive power is limited to reduce aberrations, a movable range of the compensation lens becomes relatively large to obtain a sufficient effect of the hand-vibration compensation in the conventional hand-vibration compensation system. This results problems of increased size of a binocular casing and of lowered response in driving of the compensation lenses.

SUMMARY OF THE INVENTION

It is therefore an object of the present invention to provide a binocular having hand-vibration compensation system of the lens shift type, which is capable of reducing the movable range of the compensation lens with keeping sufficient effect of the hand-vibration compensation.

For the above object, according to the present invention, there is provided a binocular, which includes: right and left telescopic optical systems arranged side by side, each of the telescopic optical systems having an objective lens, an erecting system, a pair of positive and negative compensation lenses and an observing optical system;

a driving mechanism for shifting the compensation lenses such that trembling of the image due to a hand vibration is compensated, the driving mechanism comprising:

a first frame having first and second arms that is rotatable about a rotation axis being parallel to the optical axes of both of the telescopic optical systems, the negative compensation lens of the right telescopic optical system and the positive compensation lens of the left telescopic optical system being held at the first and second arms of the first frame; and a second frame having first and second arms that is rotatable about the rotation axis, the positive compensation lens of the right telescopic optical system and the negative compensation lens of the left telescopic optical system being held at the first and second arms of the second frame;

wherein the first and second frames are rotated in the opposite directions to each other.

With this construction, the positive compensation lens and the negative compensation lens are moved in the opposite directions in each of the right and left telescopic optical systems. Since the shift of the positive lens in one direction and the shift of the negative lens in the opposite direction move the image in the same direction, the opposite movements of the positive and negative compensation lenses cause double shift amount of the image as compared with the single lens movement.

In the preferred embodiment, the driving mechanism further includes a mechanism for linking the rotations in the opposite directions of the first and second frames and an actuator for rotating the first and second frames through the linking mechanism.

The linking mechanism may be provided with drive pins formed on one of the right and left arms of the first frame and on the other arm of the second frame, a driving plate having long holes extending in the direction perpendicular to a moving direction thereof, the drive pins being inserted into the long holes, and wherein the actuator drives the driving plate in the moving direction.

The compensation lenses for each of the telescopic optical systems may be arranged between the objective lens and the erecting system.

In another case, when the erecting system includes a first prism and a second prism, the one pair of the compensation lenses may be arranged between the first and second prisms.

The pair of the positive and negative compensation lenses can move the image in only one direction. For compensating the image vibration in any directions, each of the telescopic optical system employs two pairs of the positive and negative lenses. In such the case, the first pair of the compensation lenses are arranged between the objective lens and the erecting system, and the second pair of the positive and negative lenses are arranged between the first and second prisms.

DESCRIPTION OF THE ACCOMPANYING DRAWINGS

DESCRIPTION OF THE EMBODIMENTS

Hereinafter, embodiments of the present invention will be described with reference to the accompanying drawings.
[First Embodiment]

Figure 1:
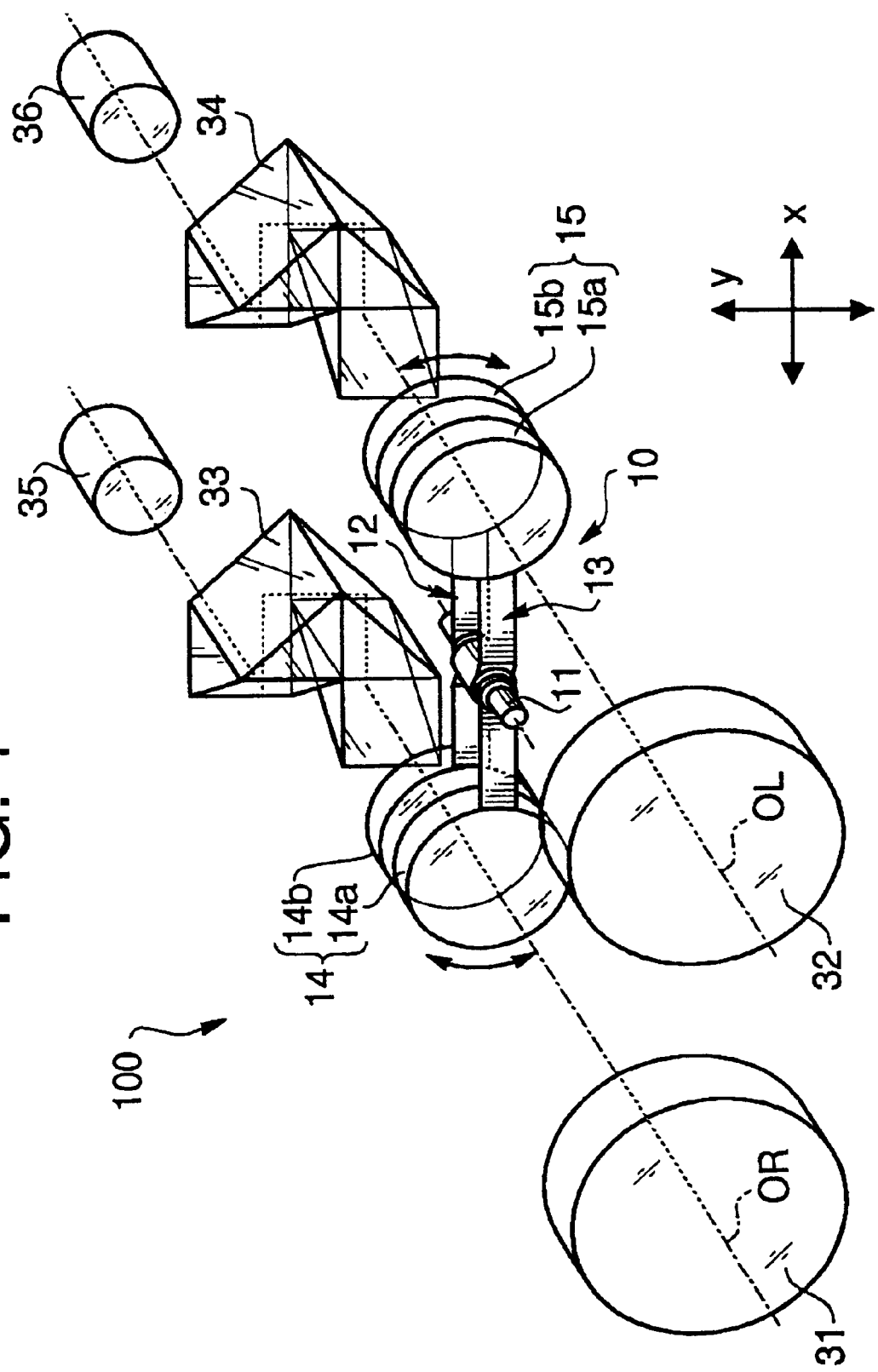
FIG. 1 is a perspective view of an optical system showing arrangement of optical elements of a binocular according to a first embodiment of the invention.

FIG. 1 shows an optical system 100 of a binocular according to a first embodiment of the invention. The binocular is provided with right and left telescopic optical systems arranged side by side for right and left eyes of a user.

The right telescopic optical system for the right eye (on the left-hand side in FIG. 1) includes a right objective lens 31 at a front end, a right erecting system 33 and a right eyepiece 35 as an observing optical system. The left telescopic optical system for the left eye (on the right-hand side in FIG. 1) also includes a left objective lens 32, a left erecting system 34 and a left eyepiece 36. It should be noted that, although the objective lenses and eyepieces are described as a single lens in the embodiments, each of the lenses may include a plurality of groups and/or a plurality of lenses.

The objective lenses 31 and 32 respectively form inverted images and the inverted images are erected into images of proper orientation through the erecting systems 33 and 34. The erecting systems 33 and 34 are type II Porro prism systems that have the same constructions and orientations to each other.

Figure 2:
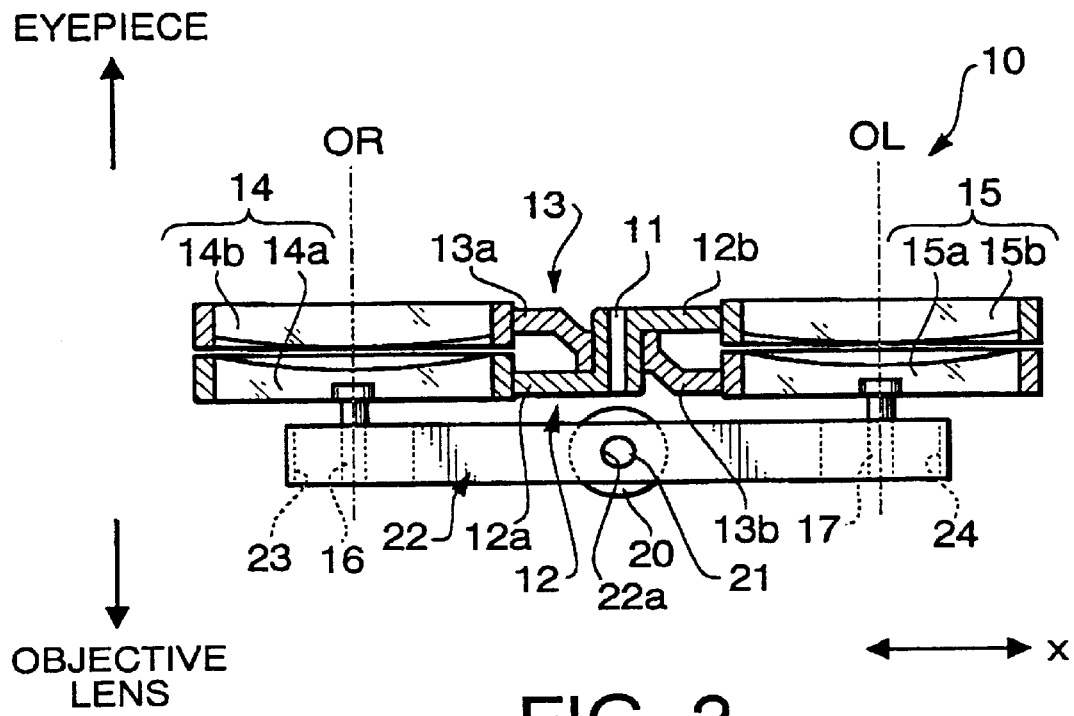
FIG. 2 is a plane view of the driving mechanism shown in FIG. 1.

In the binocular according to the first embodiment, as shown in FIGS. 1 and 2, the right telescopic optical system includes a right compensation lens system 14 that comprises a negative compensation lens 14a and a positive compensation lens 14b arranged between the objective lens 31 and the erecting system 33. The left telescopic optical system includes a left compensation lens system 15 that comprises a negative compensation lens 15a and a positive compensation lens 15b arranged between the objective lens 32 and the erecting system 34.

The negative compensation lenses 14a and 15a have the same structure (i.e., size, weight, and refractive power), and the positive compensation lenses 14b and 15b have the same structure. Further the negative compensation lens 14a and the positive compensation lens 14b are the same in weight while have opposite powers that are counterbalanced.

It should be noted that, in the accompanying drawings, an x-y axis system is indicated to clarify the direction referred to. The x-axis corresponds to the horizontal (right/left) direction when the binocular is held horizontally, and the y-axis corresponds to the vertical (up/down) direction when held horizontally. These x-axis and y-axis are perpendicular to each other in a plane perpendicular to the optical axes OR and OL of the objective lenses 31 and 32.

The compensation lenses 14a, 14b, 15a and 15b are driven in the y-axis direction by a driving mechanism 10 such that trembling of the image due to a hand-vibration in the up/down direction is compensated. The driving mechanism 10 includes a first frame 12 and a second frame 13 that are rotatable about a rotation axis 11 defined at a center of the optical axes OR and OL of the objective lenses 31 and 32.

The negative compensation lens 14a of the right telescopic optical system and the positive compensation lens 15b of the left telescopic optical system are held at both arms 12a and 12b of the first frame 12. The positive compensation lens 14b of the right telescopic optical system and the negative compensation lens 15a of the left telescopic optical system are held at both arms 13a and 13b of the second frame 13.

The first and second frames 12 and 13 cross at the rotation axis 11 to form a cross link where one arm supports the front lens and the other arm supports the rear lens. The first and second frames 12 and 13 are linked via a driving plate 22 of a linking mechanism. The linking mechanism includes drive pins 16 and 17 formed on the right arm 12a of the first frame 12 and on the left arm 13b of the second frame 13. These drive pins 16 and 17 are respectively inserted into long holes 23 and 24 formed on the driving plate 22 extending along the x-axis direction.

Figure 3:
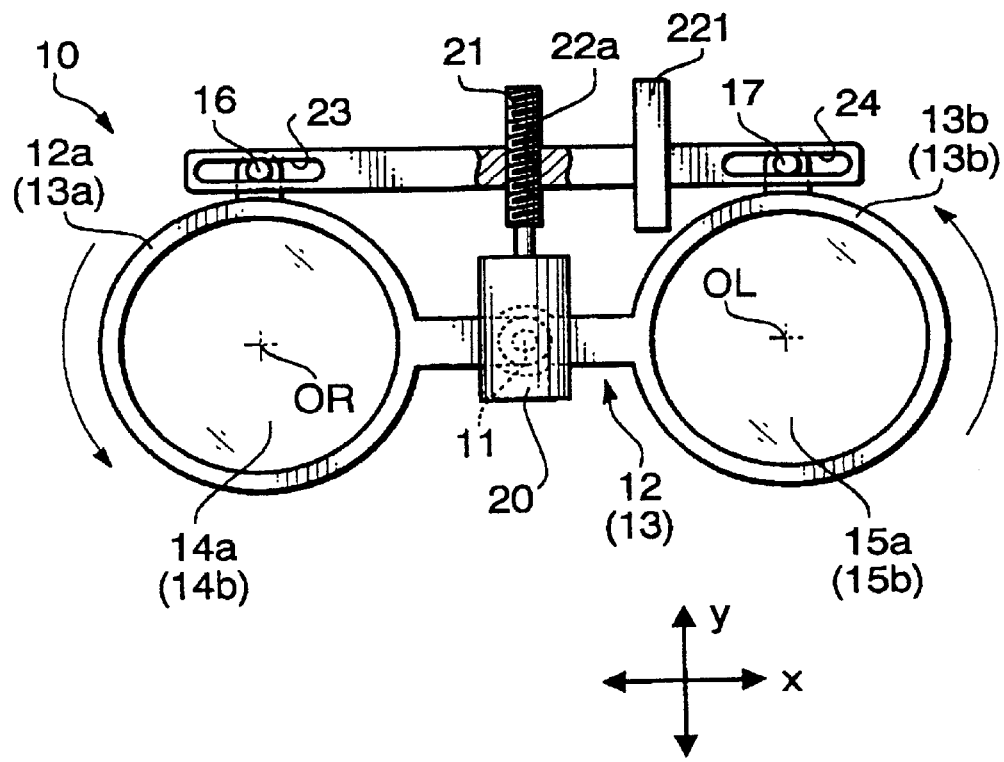
FIG. 3 is a front view of the driving mechanism shown in FIG. 1 at an initial condition.

As shown in FIGS. 2 and 3, at the center of the driving plate 22, a screw hole 22a is formed along the y-axis direction. The driving mechanism 10 further includes a motor (actuator) 20 to which a feed screw 21 is attached on an output axis. The feed screw 21 is engaged to the screw hole 22a of the driving plate 22. The driving plate 22 is guided so that it moves along the y-axis direction.

With this construction of the driving mechanism 10, a rotation of the feed screw 21 due to actuation of the motor 20 moves the driving plate 22 along the y-axis direction, which rotates the first and second frames 12 and 13 in the opposite directions by the same angles. In view of each the compensation lens systems 14 and 15, the rotation of the feed screw 21 moves the negative lens and the positive lens in the opposite directions along the y-axis direction.

At the initial position, as shown in FIG. 3, the compensation lenses 14a and 14b are positioned where the optical axes thereof coincide with the optical axis OR of the objective lens 31, and the compensation lenses 15a and 15b are positioned where the optical axes thereof coincide with the optical axis OL of the objective lens 32.

Figure 4:
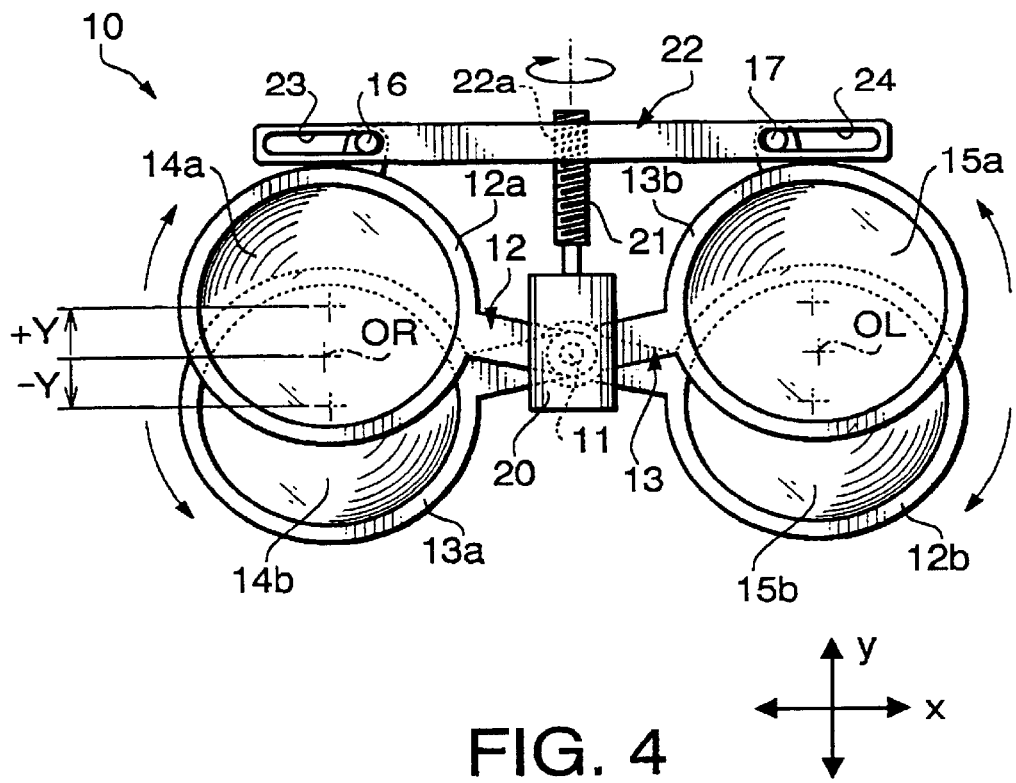
FIG. 4 is a front view of the driving mechanism shown in FIG. 1 at an actuated condition.

When the feed screw 21 is rotated in the clockwise direction in the plane view (FIG. 2), the driving plate 22 moves upward in the front view as shown in FIG. 4. The movement of the driving plate 22 rotates the first and second frames 12 and 13 such that the right arm 12a of the first frame 12 and the left arm 13b of the second arm 13 move upward and the left arm 12b and the right arm 13a move downward in FIG. 4.

As shown in FIG. 3, a y-direction position sensor 221 is provided to detect the position of the driving plate 22 in the y-axis direction. The position sensor 221 may be an optical sensor having a light emitting element and a position sensitive device (PSD).

Decentering of the lens causes prism function that bends the direction in which a light beam proceeds, and the shift of the positive lens in one direction and the shift of the negative lens in the opposite direction cause the same prism function to bend a light beam in the same direction.

As described above, the rotations of the frames 12 and 13 with the motor 20 moves the compensation lenses 14a, 14b, 15a and 15b along an arc whose center is the rotation axis 11. With respect to the y-axis direction, the negative lens 14a(15a) and the positive lens 14b(15b) move in the opposite directions by the same shift amount, the shifts of the image due to movements of the lenses are accumulated.

In the first embodiment, since the refractive powers of the negative compensation lens 14a(15a) is counterbalanced with that of the positive compensation lens 14b(15b), i.e., when the negative and positive lenses are shifted by a predetermined amount, the images are shifted by the same amount, but in the opposite direction. Therefore, the shift amount of the image when the negative compensation lens 14a moves upward in FIG. 4 by Y mm (−Y mm) and the positive lens 14b moves downward by Y mm (+Y mm) is equal to that when only the negative compensation lens moves by −2Y mm or only the positive compensation lens moves by +2Y mm. As a result, when the conventional single lens drive system requires the maximum moving amount $\pm 2Y_{max}$ mm, the double lens drive of the first embodiment requires $\pm Y_{max}$ mm to obtain the same shift amount of the image, which reduces the size of a binocular casing.

The negative lens 14a(15a) and the positive lens 14b(15b) move in the same direction with respect to the x-axis direction, the shifts of the image due to movements of the lenses are usually counterbalanced. Therefore the driving mechanism 10 shifts the image only in the y-axis direction in spite of the circular movements of the compensation lenses.

Figure 5:
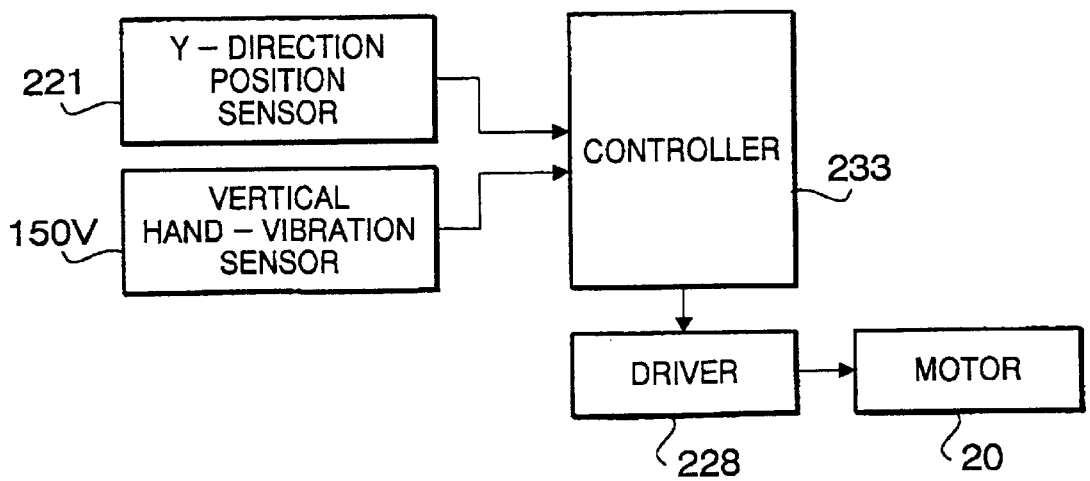
FIG. 5 shows a block diagram illustrating a control system for controlling the driving mechanism.

As shown in FIG. 5, the motor 20 is controlled by a controller 233 through driver 228. The controller 233 controls the driver 228 based on the signals from a vertical hand-vibration sensor 150V and the y-direction position sensor 221.

The controller 233 calculates amount of movement of the binocular in the y-axis direction due to the hand-vibration, and controls the driver 228 to drive the motor 20 to cancel the movement of the image due to the hand-vibration. Specifically, the controller 233 determines a target position to which the frames 12 and 13 are to be positioned for canceling change of the position of the image due to the hand-vibration based on the amount of movement detected by the hand-vibration sensor 150V. Then, the controller 233 controls the driver to move the lens frames 12 and 13 to the calculated target position with monitoring the position detected by the position sensor 221. As the above control is continuously executed, the controller 233 continuously updates the target position, and accordingly, trembling of the images due to the hand-vibration in the y-axis direction can be compensated.

In the first embodiment, since the driving plate 22 is driven by the feed screw 21 engaged thereto, the position of the driving plate 22 is stable and is not moved by an external force except the force of the motor 20. Further, the same motor 20 drives the first and second frames 12 and 13 through the linking mechanism, which results in easy control, a small space and a light weight. However, the invention is not limited to this construction, and the frames may be driven by separate motors.

Further, since the rotation axis 11 of the frames 12 and 13 is located at the center of the binocular and the arms of each frame hold the same weight compensation lenses at the same distance from the center axis 11, it realizes a well balanced binocular in the right-left direction (x-axis direction). And also, since the frames 12 and 13 rotate in the opposite directions, inertial moments of the rotations are counterbalanced without generating vibration.

[Second Embodiment]

Figure 6:
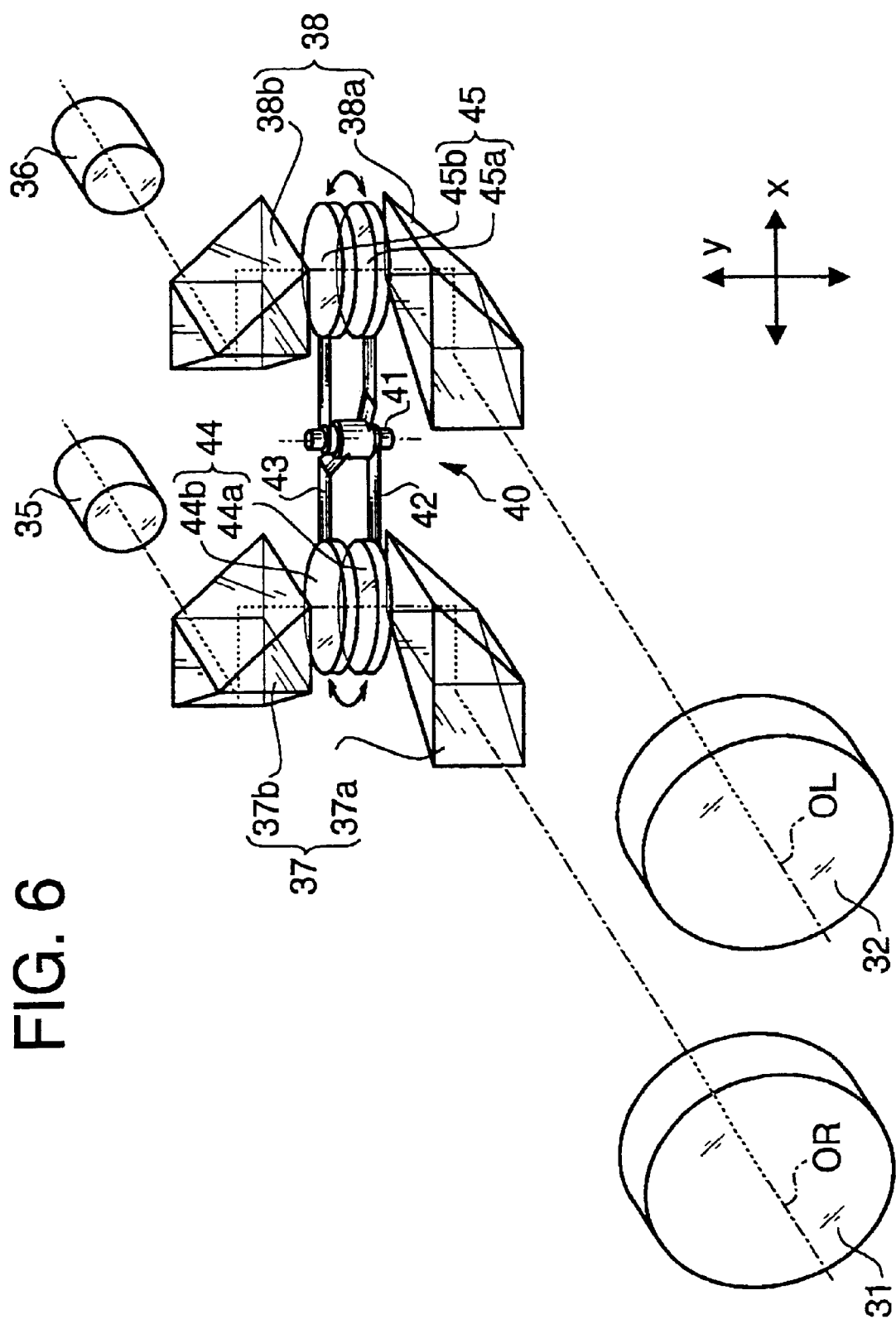
FIG. 6 is a perspective view showing arrangement of optical elements of a binocular according to a second embodiment of the invention.

FIG. 6 shows a binocular having a hand-vibration compensation system according to a second embodiment of the present invention.

In the second embodiment, a right telescopic optical system includes an objective lens 31, an erecting system 37 and an eyepiece 35. A left telescopic optical system includes an objective lens 32, an erecting system 38 and an eyepiece 36.

The right erecting system 37 is provided with first and second prisms 37a and 37b that are arranged in the vertical direction. The first prism 37a has two reflection surfaces for rotating the image by 90 degrees and deflecting the optical axis OR of the object lens 31 to the y-axis direction. The inverted image formed by the objective lens 31 is rotated by the first prism 37a to form a rotated image. The second prism 37b has two reflection surfaces for further rotating the image by 90 degrees and further deflecting the deflected optical axis to be coincide with the optical axis of the eyepiece 35. Specifically, the prisms 37a and 37b are formed by dividing a type II Porro prism into two separate elements.

Similar to the erecting system 37, the left erecting system 38 includes a first and second prisms 38a and 38b that are formed by dividing the type II Porro prism. It should be noted that orientations of the prisms 37a and 38a are similar, and orientations of the prisms 37b and 38b are similar.

With this structure, the first prism 38a rotates the inverted image formed by the objective lens 32 by 90 degrees to form a rotated image and deflects the optical axis OL of the left object lens 32 to the y-axis direction. The light reflected inside the first prism 38a is then incident on the second prism 38b in which the orientation of the image is further rotated by 90 degrees and the optical axis along the y-axis direction is deflected to be coincide with the optical axis of the left eyepiece 36.

In the second embodiment, compensation lens systems 44 and 45 are provided.

The right compensation lens system 44 comprises a pair of negative and positive compensation lenses 44a and 44b that are arranged between the first and second prisms 37a and 37b. The left compensation lens system 45 comprises a pair of negative and positive lenses 45a and 45b that are arranged between the first and second prisms 38a and 38b.

The compensation lenses are driven by a driving mechanism 40 that is similar to the driving mechanism 10 in the first embodiment. That is, the negative compensation lens 44a and the positive compensation lens 45b are held at the arms of the first frame 42 and the positive compensation lens 44b and the negative compensation lens 45a are held at the arms of the second frame 43. The first and second frames 42 and 43 are rotatable about a rotation axis 41 that is parallel to the y-axis direction.

The driving mechanism 40 of the second embodiment also includes a motor and a liking mechanism as similar to the first embodiment. Accordingly, the first and second frames 42 and 43 are rotated in the opposite directions to each other to be controlled by a controlling system similar to that shown in FIG. 5.

With the above construction, the compensation lenses are driven in the direction parallel to the optical axes OR and OL. At the position of the compensation lenses, the inverted images are rotated by 90 degrees through the first prisms 37a and 38a, the movements of the compensation lenses move the image in the horizontal (right/left) direction in the user view.

The controlling system of the second embodiment is provided with a horizontal hand-vibration sensor that detects the hand-vibration in the x-axis direction and an x-direction position sensor that detects the position of the driving plate 22 (See FIG. 3). Although the driving plate 22 actually moves in the direction parallel to the optical axes OR and OL in the second embodiment, the movement of this plate shifts the images in the x-axis direction in the user view, the sensor called as the x-direction position sensor.

The controller of the second embodiment calculates amount of movement of the binocular in the x-axis direction due to the hand-vibration, and controls the driver to drive the motor to cancel the movement of the image due to the hand-vibration. As a result, trembling of the images due to the hand-vibration in the x-axis direction can be compensated.

[Third Embodiment]

Figure 7:
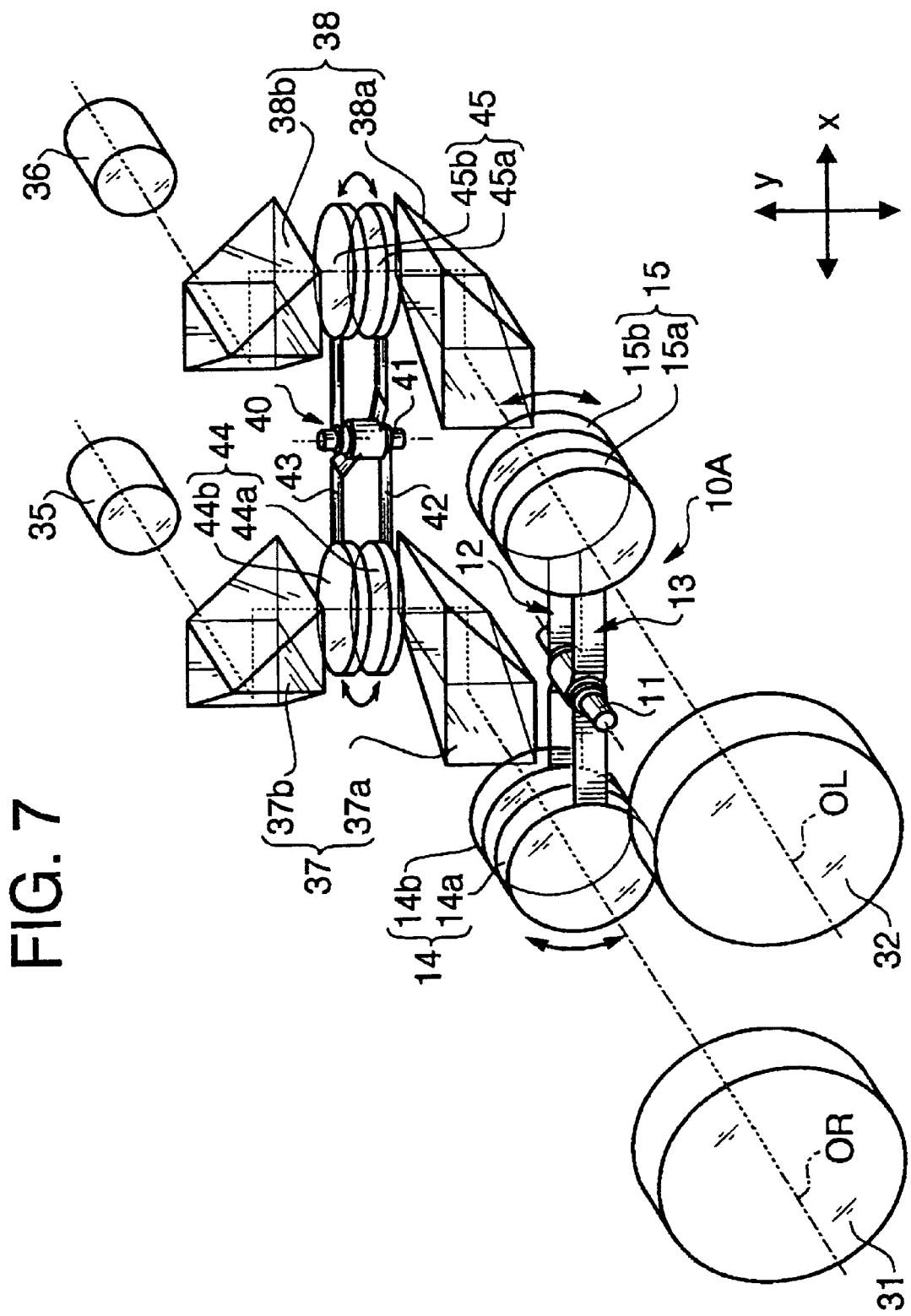
FIG. 7 is a perspective view showing arrangement of optical elements of a binocular according to a third embodiment of the invention.

FIG. 7 shows a binocular having a hand-vibration compensation system according to a third embodiment of the present invention. The third embodiment is a combination of the first and second embodiments.

In the third embodiment, a right telescopic optical system includes an objective lens 31, an erecting system 37 and an eyepiece 35. A left telescopic optical system includes an objective lens 32, an erecting system 38 and an eyepiece 36.

The right erecting system 37 includes first and second prisms 37a and 37b, the left erecting system 38 includes first and second prisms 38a and 38b.

Each of the telescopic optical system employs two compensation lens systems. For the right telescopic optical system, the first compensation lens system 14 is arranged between the objective lens 31 and the electing system 37, and the second compensation lens system 44 is arranged between the first and second prisms 37a and 37b. In the same manner, the left telescopic optical system includes the first and second compensation lens systems 15 and 45.

The compensation lens systems 14, 15, 44 and 45 includes negative and positive lenses 14a and 14b, 15a and 15b, 44a and 44b, and 45a and 45b. A driving mechanism 10 has the same structure as the first embodiment and a mechanism 40 has the same structure as the second embodiment.

The binocular of the third embodiment includes a controlling system comprises an x-direction position sensor, a y-direction position sensor, a horizontal hand-vibration sensor, a vertical hand-vibration sensor, a controller and drivers for motors provided by the driving mechanisms 10 and 40.

With this construction, the first compensation lens systems 14 and 15 are driven by the driving mechanism 10 to compensate the vibration of the image in the y-axis (vertical) direction in the user view, the second compensation lens systems 44 and 45 are driven by the driving mechanism 40 to compensate the vibration of the image in the x-axis (horizontal) direction in the user view. As a result, vibration of the image in any directions can be compensated.

It should be noted that, in the embodiments, the erected images are observed through the eyepieces. The invention is not limited to this particular structure, and is applicable to a binocular in which imaging devices (e.g., a CCD: a Charge Coupled Device) and an imaging lenses are used in place of, or in association of the eyepieces.

Further, the negative and positive compensation lenses may have refraction powers such that the shifting amounts, when the lenses are moved by the same amount, are different. For example, when the negative and positive lenses are shifted by amount d, the shifting amounts of the images may be −1.5 d by the negative lens, and d by the positive lens. In such a case, the shifting amounts of the lenses should be also changed accordingly. This can be achieved by changing the arm lengths of the frames so that the radius of rotation of each of the compensation lenses are adjusted.

The present invention is directed to part of a binocular that includes hand-vibration sensors, sensors for detecting the position of the compensation lenses. However, the details of the hand-vibration sensors and/or position sensors do not form part of the invention. These are provided to assist in understanding of the invention, and any types of suitable hand-vibration sensors and/or position detecting sensors could be employed to control the driving mechanism for the compensation lenses.

The present disclosure relates to the subject matter contained in Japanese Patent Application No. HEI 09-331739, filed on Dec. 2, 1997, which is expressly incorporated herein by reference in its entirety.

What is claimed is:

1. A binocular comprising:

right and left telescopic optical systems arranged side by side, each of said telescopic optical systems having an objective lens, an erecting system, a pair of positive and negative compensation lenses and an observing optical system arranged along an optical axis;

a driving mechanism for shifting said compensation lenses such that trembling of said image due to a hand vibration is compensated, said driving mechanism comprising:

a first frame having first and second arms that is rotatable about a rotation axis that is parallel to the optical axes of both of said telescopic optical systems, the negative compensation lens of said right telescopic optical system and the positive compensation lens of said left telescopic optical system being held at said first and second arms of said first frame; and a second frame having first and second arms that is rotatable about said rotation axis, the positive compensation lens of said right telescopic optical system and the negative compensation lens of said left telescopic optical system being held at said first and second arms of said second frame;

wherein said first and second frames are rotated in the opposite directions to each other.

2. The binocular according to claim 1, wherein said driving mechanism further comprises a mechanism for linking the rotations in the opposite directions of said first and second frames and an actuator for rotating said first and second frames through said linking mechanism.

3. The binocular according to claim 2, wherein said linking mechanism comprises drive pins formed on one of said right and left arms of said first frame and on the other arm of said second frame, a driving plate having long holes extending in the direction perpendicular to a moving direction thereof, said drive pins being inserted into said long holes, and wherein said actuator drives said driving plate in said moving direction.

4. The binocular according to claim 1, wherein said one pair of the compensation lenses for each of said telescopic optical systems are arranged between said objective lens and said erecting system.

5. The binocular according to claim 1, wherein said erecting system includes a first prism and a second prism, said first prism having two reflection surfaces for rotating an image by 90 degrees, said second prism having two reflection surfaces for further rotating said image by 90 degrees, and wherein said one pair of the compensation lenses are arranged between said first and second prisms.

6. The binocular according to claim 5, further comprising another pair of positive and negative compensation lenses that are arranged between said objective lens and said erecting system for each of said telescopic optical systems, and another driving mechanism that includes two frames rotatable about another rotation axis that is parallel to the optical axes of said objective lenses, wherein said two frames holds the compensation lenses in the same manner as said first and second frames.

7. The binocular according to claim 1, wherein each of said negative compensation lenses and each of said positive compensation lenses are the same in weight while have opposite powers that are counterbalanced.

8. The binocular according to claim 7, wherein said first and second frames holds said negative and positive compensation lenses at the same distances from said rotation axis.

* * * * *